United States Patent
Wierzynski

(10) Patent No.: US 10,878,320 B2
(45) Date of Patent: Dec. 29, 2020

(54) TRANSFER LEARNING IN NEURAL NETWORKS

(71) Applicant: QUALCOMM Incorporated, San Diego, CA (US)

(72) Inventor: Casimir Matthew Wierzynski, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 735 days.

(21) Appl. No.: 14/851,911

(22) Filed: Sep. 11, 2015

(65) Prior Publication Data

US 2017/0024641 A1    Jan. 26, 2017

Related U.S. Application Data

(60) Provisional application No. 62/195,763, filed on Jul. 22, 2015.

(51) Int. Cl.
| | | |
|---|---|---|
| G06N 3/08 | (2006.01) | |
| G06N 3/04 | (2006.01) | |
| G06K 9/46 | (2006.01) | |

(52) U.S. Cl.
CPC .......... *G06N 3/084* (2013.01); *G06K 9/4628* (2013.01); *G06N 3/0454* (2013.01); *G06N 3/0445* (2013.01)

(58) Field of Classification Search
CPC ....... G06N 3/08; G06N 3/0454; G06N 99/005
See application file for complete search history.

(56) References Cited

U.S. PATENT DOCUMENTS

| | | | | |
|---|---|---|---|---|
| 5,224,203 | A * | 6/1993 | Skeirik | G05B 13/027 |
| | | | | 706/23 |
| 7,603,330 | B2 | 10/2009 | Gupta et al. | |
| 7,835,910 | B1 | 11/2010 | Hakkani-Tur et al. | |
| 8,577,820 | B2 | 11/2013 | Jin et al. | |
| 9,460,711 | B1 * | 10/2016 | Vanhoucke | G10L 15/16 |
| 2012/0054184 | A1 * | 3/2012 | Masud | G06F 17/30598 |
| | | | | 707/737 |
| 2013/0266214 | A1 | 10/2013 | Lillywhite et al. | |
| 2014/0164297 | A1 | 6/2014 | Deolalikar et al. | |
| 2015/0127594 | A1 * | 5/2015 | Parada San Martin | |
| | | | | G06N 3/0454 |
| | | | | 706/16 |
| 2016/0132786 | A1 * | 5/2016 | Balan | G06N 99/005 |
| | | | | 706/12 |

(Continued)

FOREIGN PATENT DOCUMENTS

EP    3144859 A2    3/2017

OTHER PUBLICATIONS

Pedro O. Pinheiro and Ronan Collobert, "Recurrent Convolutional Neural Networks for Scene Labeling", 2014, Proceedings of the 31st International Conference on Machine Learning, Beijing, China, 2014. JMLR: W&CP vol. 32. p. 1-9. (Year: 2014).*

(Continued)

*Primary Examiner* — Kamran Afshar
*Assistant Examiner* — Ying Yu Chen
(74) *Attorney, Agent, or Firm* — Seyfarth Shaw LLP

(57) ABSTRACT

A method of transfer learning includes receiving second data and generating, via a first network, second labels for the second data. In one configuration, the first network has been previously trained on first labels for first data. Additionally, the second labels are generated for training a second network.

26 Claims, 12 Drawing Sheets

(56) References Cited

U.S. PATENT DOCUMENTS

2016/0217198 A1* 7/2016 Lee ............... G06N 3/0454
2016/0253597 A1* 9/2016 Bhatt ............... G06N 20/00
706/12

OTHER PUBLICATIONS

Jing Huang, Xiaodong Cui, and Jen-Tzung Chien, "Cross-View Transfer Learning for Automatic Speech Recognition", Jan. 2010, ResearchGate, pp. 1-5. (Year: 2010).*
Blicilua C., et al., "Model Compression", Proceedings of the Twelth ACM SIGKDD International Conference on Knowledge Discovery and Data Mining : Aug. 20-23, 2006, Philadelphia, PA, USA, New York, NY: ACM Press, 2 Penn Plaza, Suite 701, New York, NY, 10121-0701, USA, Aug. 20, 2006 (Aug. 20, 2006), XP058107730, pp. 535-541.
International Search Report and Written Opinion—PCT/US2016/039661—ISA/EPO—dated Apr. 6, 2017.
Jimmy L., et al., "Do Deep Nets Really Need to be Deep?", Draft for NIPS 2014 (not camera ready copy), Oct. 11, 2014 (Oct. 11, 2014), XP055359459, pp. 1-10. Retrieved from the Internet: URL: https://arxiv.org/pdf/1312.6184v7.pdf.
Geng X., et al., "Incremental Learning", Encyclopedia of Biometrics, 2009, pp. 731-735, XP055423378, DOI: 10.1007/978-1-4899-7488-4_304[Retrieved on Nov. 9, 2017].
Nakayama H., "Image Feature Extraction and Transfer Learning Using Deep Convolutional Neural Networks", IEICE Technical Report, The Institute of Electronics, Information and Communication Engineers, Jul. 9, 2015, vol. 115, No. 146, pp. 55-59.
Tokui S., "Deep Learning from Optimization Point of View", Operations Research, Operations Research Society of Japan, Apr. 1, 2015, vol. 60, No. 4, pp. 191-197.

* cited by examiner

TRANSFER LEARNING IN NEURAL NETWORKS

CROSS REFERENCE TO RELATED APPLICATION

This application claims the benefit under 35 U.S.C. § 119(e) to U.S. Provisional Patent Application No. 62/195,763, entitled "TRANSFER LEARNING IN NEURAL NETWORKS," filed on Jul. 22, 2015, the disclosure of which is expressly incorporated herein by reference in its entirety.

BACKGROUND

Field

Certain aspects of the present disclosure generally relate to machine learning and, more particularly, to improving systems and methods for transferring learning in neural networks.

Background

An artificial neural network, which may comprise an interconnected group of artificial neurons (e.g., neuron models), is a computational device or represents a method to be performed by a computational device.

Convolutional neural networks are a type of feed-forward artificial neural network. Convolutional neural networks may include collections of neurons that each have a receptive field and that collectively tile an input space. Convolutional neural networks (CNNs) have numerous applications. In particular, CNNs have broadly been used in the area of pattern recognition and classification.

Deep learning architectures, such as deep belief networks and deep convolutional networks, are layered neural networks architectures in which the output of a first layer of neurons becomes an input to a second layer of neurons, the output of a second layer of neurons becomes and input to a third layer of neurons, and so on. Deep neural networks may be trained to recognize a hierarchy of features and so they have increasingly been used in object recognition applications. Like convolutional neural networks, computation in these deep learning architectures may be distributed over a population of processing nodes, which may be configured in one or more computational chains. These multi-layered architectures may be trained one layer at a time and may be fine-tuned using back propagation.

Other models are also available for object recognition. For example, support vector machines (SVMs) are learning tools that can be applied for classification. Support vector machines include a separating hyperplane (e.g., decision boundary) that categorizes data. The hyperplane is defined by supervised learning. A desired hyperplane increases the margin of the training data. In other words, the hyperplane should have the greatest minimum distance to the training examples.

Although these solutions achieve excellent results on a number of classification benchmarks, their computational complexity can be prohibitively high. Additionally, training of the models may be challenging.

SUMMARY

In one aspect of the present disclosure, a method for transfer learning is disclosed. The method includes receiving second data. The method also includes generating, via a first network, second labels for the second data. In one configuration, the first network has been previously trained on first labels for first data. Furthermore, the second labels are generated for training a second network, Another aspect of the present disclosure is directed to an apparatus including means for receiving second data. The apparatus also includes means for generating, via a first network, second labels for the second data. In one configuration, the first network has been previously trained on first labels for first data. Furthermore, the second labels are generated for training a second network.

In another aspect of the present disclosure, a computer program product for transfer learning is disclosed. The computer program product has a non-transitory computer-readable medium with non-transitory program code recorded thereon. The program code is executed by a processor and includes program code to receive second data. The program code also includes program code to generate, via a first network, second labels for the second data. In one configuration, the first network has been previously trained on first labels for first data. Furthermore, the second labels are generated for training a second network.

Another aspect of the present disclosure is directed to an apparatus for transfer learning having a memory unit and one or more processors coupled to the memory. The processor(s) is configured to receive second data. The processor(s) is also configured to generate, via a first network, second labels for the second data. In one configuration, the first network has been previously trained on first labels for first data. Furthermore, the second labels are generated for training a second network.

In one aspect of the present disclosure, a method for transfer learning is disclosed. The method includes receiving second labels generated by a first network using second data. In one configuration, the first network has been previously trained on first labels and first data. The method also includes training a second network on the second labels and the second data.

Another aspect of the present disclosure is directed to an apparatus including means for receiving second labels generated by a first network using second data. In one configuration, the first network has been previously trained on first labels and first data. The apparatus also includes means for training a second network on the second labels and the second data.

In another aspect of the present disclosure, a computer program product for transfer learning is disclosed. The computer program product has a non-transitory computer-readable medium with non-transitory program code recorded thereon. The program code is executed by a processor and includes program code to receive second labels generated by a first network using second data. In one configuration, the first network has been previously trained on first labels and first data. The program code also includes program code to train a second network on the second labels and the second data.

Another aspect of the present disclosure is directed to an apparatus for transfer learning having a memory and one or more processors coupled to the memory. The processor(s) is configured to receive second labels generated by a first network using second data. In one configuration, the first network has been previously trained on first labels and first data. The processor(s) is also configured to train a second network on the second labels and the second data.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
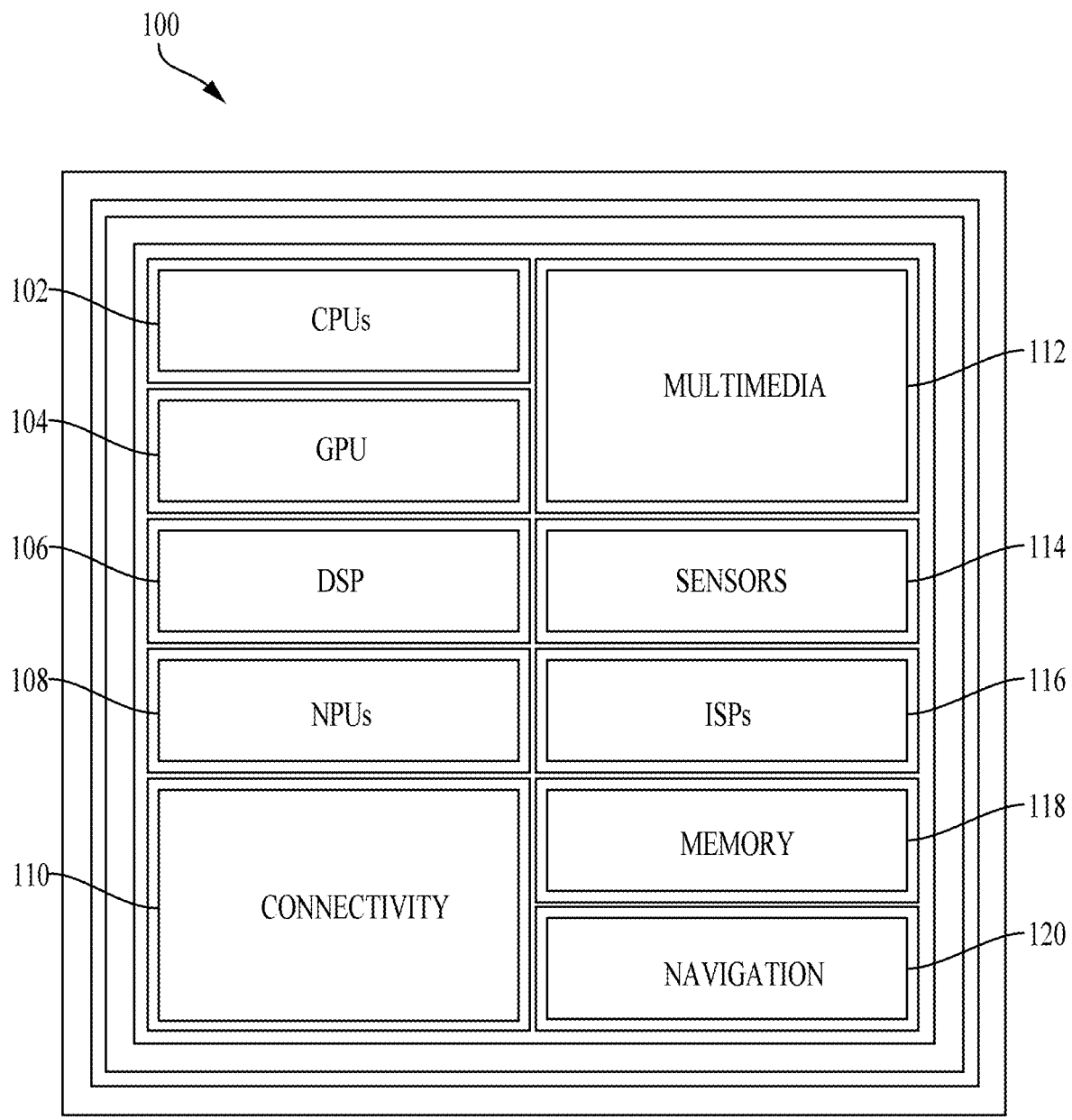
FIG. 1 illustrates an example implementation of designing a neural network using a system-on-a-chip (SOC), including a general-purpose processor in accordance with certain aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Neural networks may be trained on a training set that includes labels and corresponding data to classify objects from an input. For example, a first neural network may be trained on labeled images of cars to identify different types of cars. In some cases, it may be desirable to add new classes and/or modify the boundaries of existing classes after a network has been trained. Still, for various reasons, the training set may no longer be available after a first neural network has been trained. Therefore, because the training set is no longer available, incremental learning may not be performed on the network to add new classes and/or modify the boundaries of existing classes after a network has been trained.

Therefore, it may be desirable to transfer the learning of a first neural network to a second neural network to allow for incremental learning by the second neural network. For example, because the original training set may not be available after training the first neural network, the first neural network may be specified to label new data to train a second neural network that approximates the first neural network. The second neural network may then be used for incremental learning or other tasks.

FIG. 1 illustrates an example implementation of the aforementioned transfer learning using a system-on-a-chip (SOC) 100, which may include a general-purpose processor (CPU) or multi-core general-purpose processors (CPUs) 102 in accordance with certain aspects of the present disclosure. Variables (e.g., neural signals and synaptic weights), system parameters associated with a computational device (e.g., neural network with weights), delays, frequency bin information, and task information may be stored in a memory block associated with a neural processing unit (NPU) 108 or in a dedicated memory block 118. Instructions executed at the general-purpose processor 102 may be loaded from a program memory associated with the CPU 102 or may be loaded from a dedicated memory block 118. The SOC 100 may also include additional processing blocks tailored to specific functions, such as a graphics processing unit (GPU) 104, a digital signal processor (DSP) 106, a connectivity block 110, which may include fourth generation long term evolution (4G LTE) connectivity, unlicensed Wi-Fi connectivity, USB connectivity, Bluetooth connectivity, and the like, and a multimedia processor 112 that may, for example, detect and recognize gestures. The SOC 100 may also include a sensor processor 114, image signal processors (ISPs), and/or navigation 120, which may include a global positioning system.

The SOC 100 may be based on an ARM instruction set. In an aspect of the present disclosure, the instructions loaded into the general-purpose processor 102 may comprise code for receiving second labels generated by a first network using second data. The first network was previously trained on first labels and first data. The instructions loaded into the general-purpose processor 102 may also comprise code for training a second network on the second labels and the second data.

In another aspect, the instructions loaded into the general-purpose processor 102 comprise code for receiving second data, and code for generating, via a first network, second labels for the second data. The first network was previously trained on first labels for first data. The second labels are generated for training a second network. The second data may be unlabeled or the data may be labeled with the labels ignored. The instructions loaded into the general-purpose processor 102 may also comprise code for training a second network on the second labels and the second data.

Figure 2:
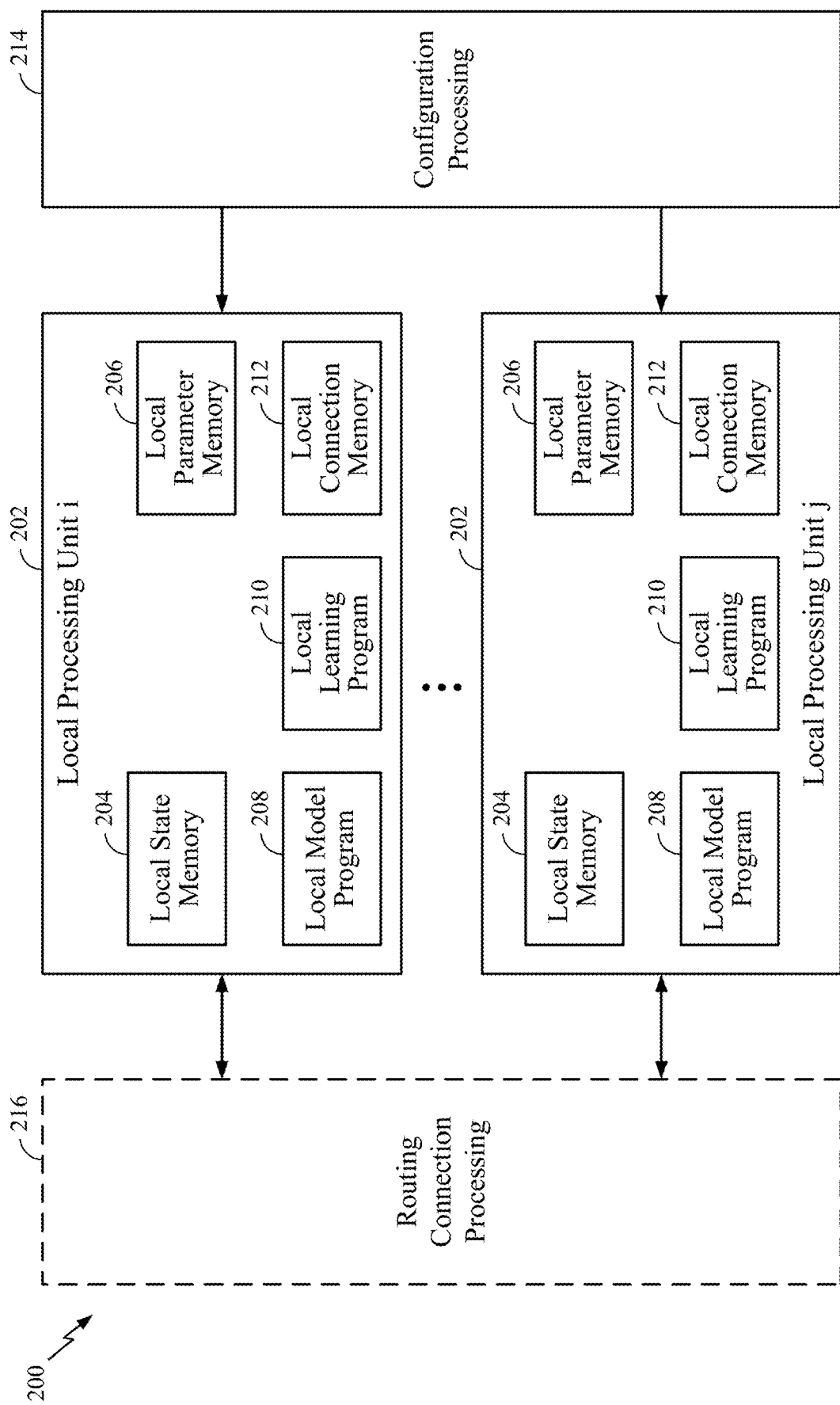
FIG. 2 illustrates an example implementation of a system in accordance with aspects of the present disclosure.

FIG. 2 illustrates an example implementation of a system 200 in accordance with certain aspects of the present disclosure. As illustrated in FIG. 2, the system 200 may have multiple local processing units 202 that may perform various operations of methods described herein. Each local processing unit 202 may comprise a local state memory 204 and a local parameter memory 206 that may store parameters of a neural network. In addition, the local processing unit 202 may have a local (neuron) model program (LMP) memory 208 for storing a local model program, a local learning program (LLP) memory 210 for storing a local learning program, and a local connection memory 212. Furthermore, as illustrated in FIG. 2, each local processing unit 202 may interface with a configuration processor unit 214 for providing configurations for local memories of the local processing unit, and with a routing connection processing unit 216 that provides routing between the local processing units 202.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize simple features, such as edges, in the input stream. If presented with auditory data, the first layer may learn to recognize spectral power in specific frequencies. The second layer, taking the output of the first layer as input, may learn to recognize combinations of features, such as simple shapes for visual data or combinations of sounds for auditory data. Higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer is communicated to another neuron in the same layer. A recurrent architecture may be helpful in recognizing patterns that unfold in time. A connection from a neuron in a given layer to a neuron in a lower layer is called a feedback (or top-down) connection. A network with many feedback connections may be helpful when the recognition of a high level concept may aid in discriminating the particular low-level features of an input.

Figure 3A:
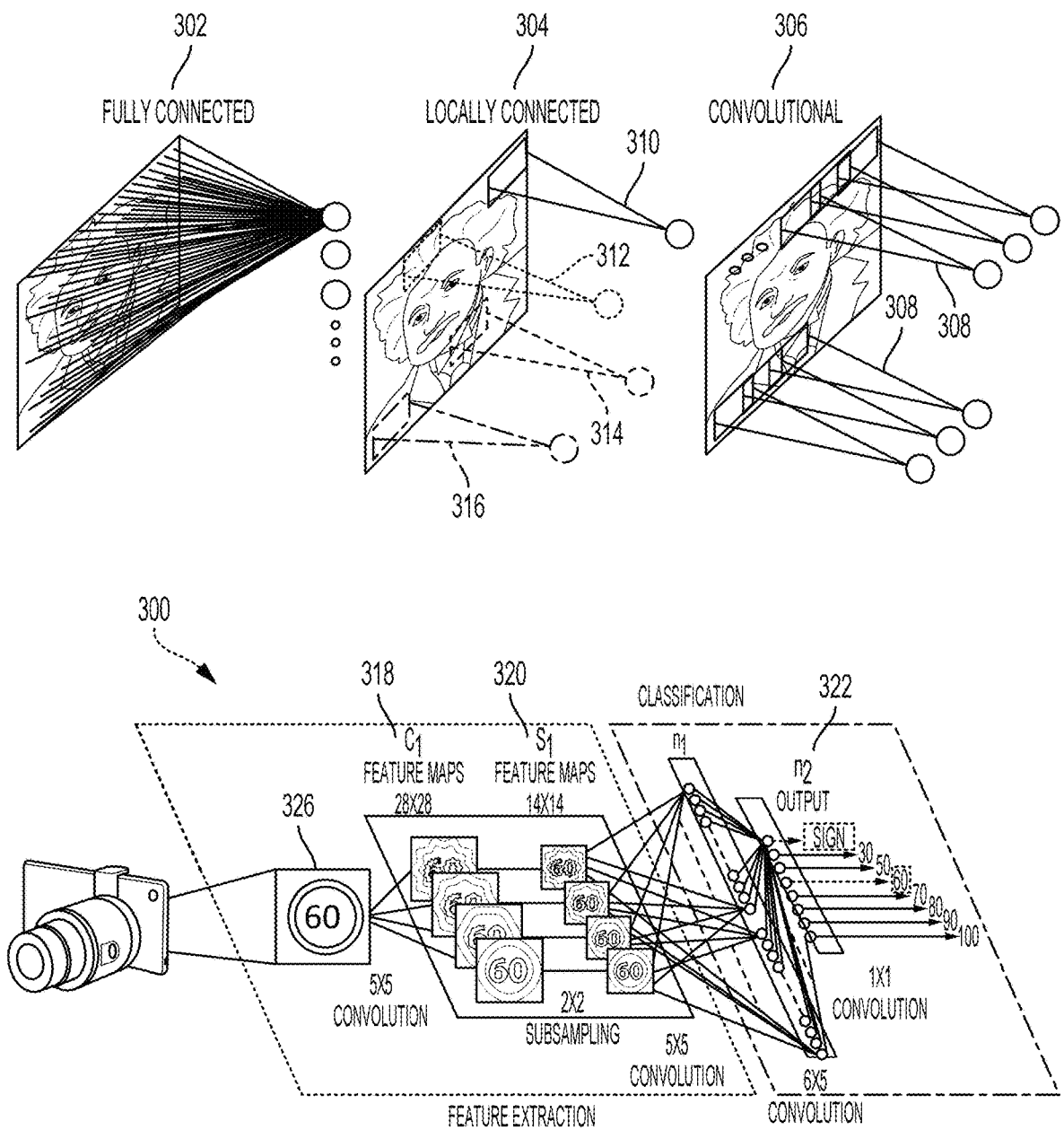
FIG. 3A is a diagram illustrating a neural network in accordance with aspects of the present disclosure.

Referring to FIG. 3A, the connections between layers of a neural network may be fully connected 302 or locally connected 304. In a fully connected network 302, a neuron in a given layer may communicate its output to every neuron in the next layer. Alternatively, in a locally connected network 304, a neuron in a given layer may be connected to a limited number of neurons in the next layer. A convolutional network 306 may be locally connected, and is furthermore a special case in which the connection strengths associated with each neuron in a given layer are shared (e.g., 308). More generally, a locally connected layer of a network may be configured so that each neuron in a layer will have the same or a similar connectivity pattern, but with connections strengths that may have different values (e.g., 310, 312, 314, and 316). The locally connected connectivity pattern may give rise to spatially distinct receptive fields in a higher layer, because the higher layer neurons in a given region may receive inputs that are tuned through training to the properties of a restricted portion of the total input to the network.

Locally connected neural networks may be well suited to problems in which the spatial location of inputs is meaningful. For instance, a network 300 designed to recognize visual features from a car-mounted camera may develop high layer neurons with different properties depending on their association with the lower versus the upper portion of the image. Neurons associated with the lower portion of the image may learn to recognize lane markings, for example, while neurons associated with the upper portion of the image may learn to recognize traffic lights, traffic signs, and the like.

A DCN may be trained with supervised learning. During training, a DCN may be presented with an image 326, such as a cropped image of a speed limit sign, and a "forward pass" may then be computed to produce an output 328. The output 328 may be a vector of values corresponding to features such as "sign," "60," and "100." The network designer may want the DCN to output a high score for some of the neurons in the output feature vector, for example the ones corresponding to "sign" and "60" as shown in the output 328 for a network 300 that has been trained. Before training, the output produced by the DCN is likely to be incorrect, and so an error may be calculated between the actual output and the target output. The weights of the DCN may then be adjusted so that the output scores of the DCN are more closely aligned with the target.

To properly adjust the weights, a learning algorithm may compute a gradient vector for the weights. The gradient may indicate an amount that an error would increase or decrease if the weight were adjusted slightly. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted so as to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level.

After learning, the DCN may be presented with new images 326 and a forward pass through the network may yield an output 328 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of restricted Boltzmann machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer 318, 320, and 322, with each element of the feature map (e.g., 320) receiving input from a range of neurons in the previous layer (e.g., 318) and from each of the multiple channels. The values in the feature map may be further processed with a non-linearity, such as a rectification, max(0,x). Values from adjacent neurons may be further pooled 324, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 3B:
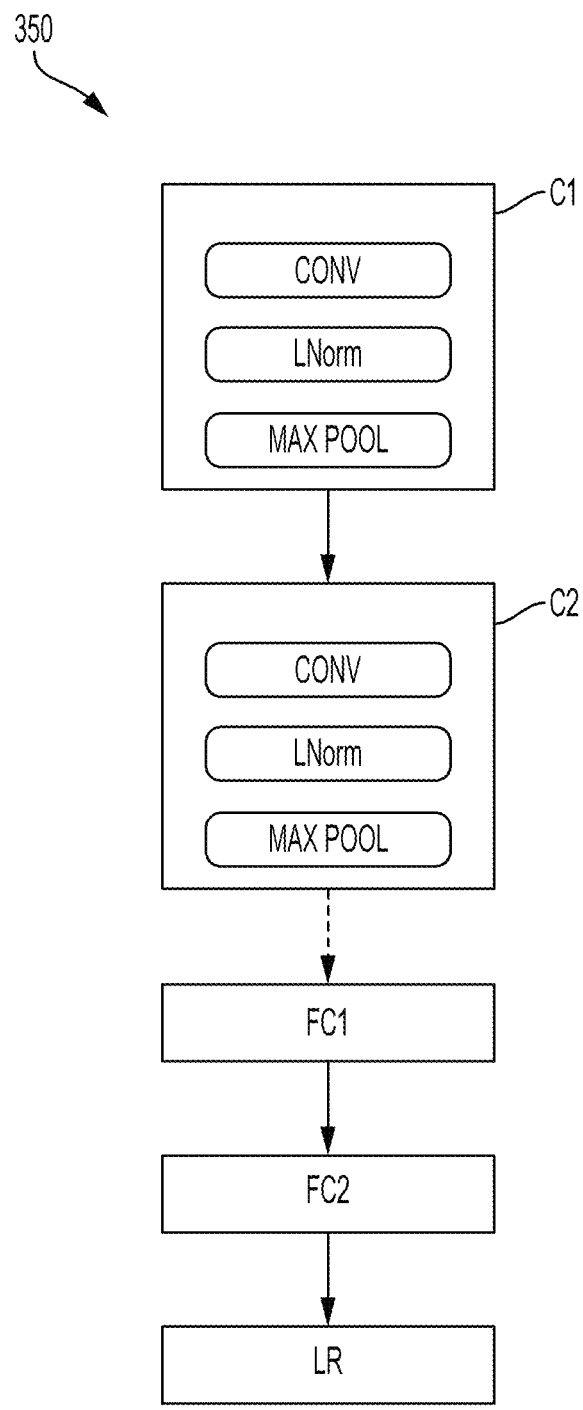
FIG. 3B is a block diagram illustrating an exemplary deep convolutional network (DCN) in accordance with aspects of the present disclosure.

FIG. 3B is a block diagram illustrating an exemplary deep convolutional network 350. The deep convolutional network 350 may include multiple different types of layers based on connectivity and weight sharing. As shown in FIG. 3B, the exemplary deep convolutional network 350 includes multiple convolution blocks (e.g., C1 and C2). Each of the convolution blocks may be configured with a convolution layer, a normalization layer (LNorm), and a pooling layer. The convolution layers may include one or more convolutional filters, which may be applied to the input data to generate a feature map. Although only two convolution blocks are shown, the present disclosure is not so limiting, and instead, any number of convolutional blocks may be included in the deep convolutional network 350 according to design preference. The normalization layer may be used to normalize the output of the convolution filters. For example, the normalization layer may provide whitening or lateral inhibition. The pooling layer may provide down sampling aggregation over space for local invariance and dimensionality reduction.

The parallel filter banks, for example, of a deep convolutional network may be loaded on a CPU 102 or GPU 104 of an SOC 100, optionally based on an ARM instruction set, to achieve high performance and low power consumption. In alternative embodiments, the parallel filter banks may be loaded on the DSP 106 or an ISP 116 of an SOC 100. In addition, the DCN may access other processing blocks that may be present on the SOC, such as processing blocks dedicated to sensors 114 and navigation 120.

The deep convolutional network 350 may also include one or more fully connected layers (e.g., FC1 and FC2). The deep convolutional network 350 may further include a logistic regression (LR) layer. Between each layer of the deep convolutional network 350 are weights (not shown) that are to be updated. The output of each layer may serve as an input of a succeeding layer in the deep convolutional network 350 to learn hierarchical feature representations from input data (e.g., images, audio, video, sensor data and/or other input data) supplied at the first convolution block C1.

Figure 4:
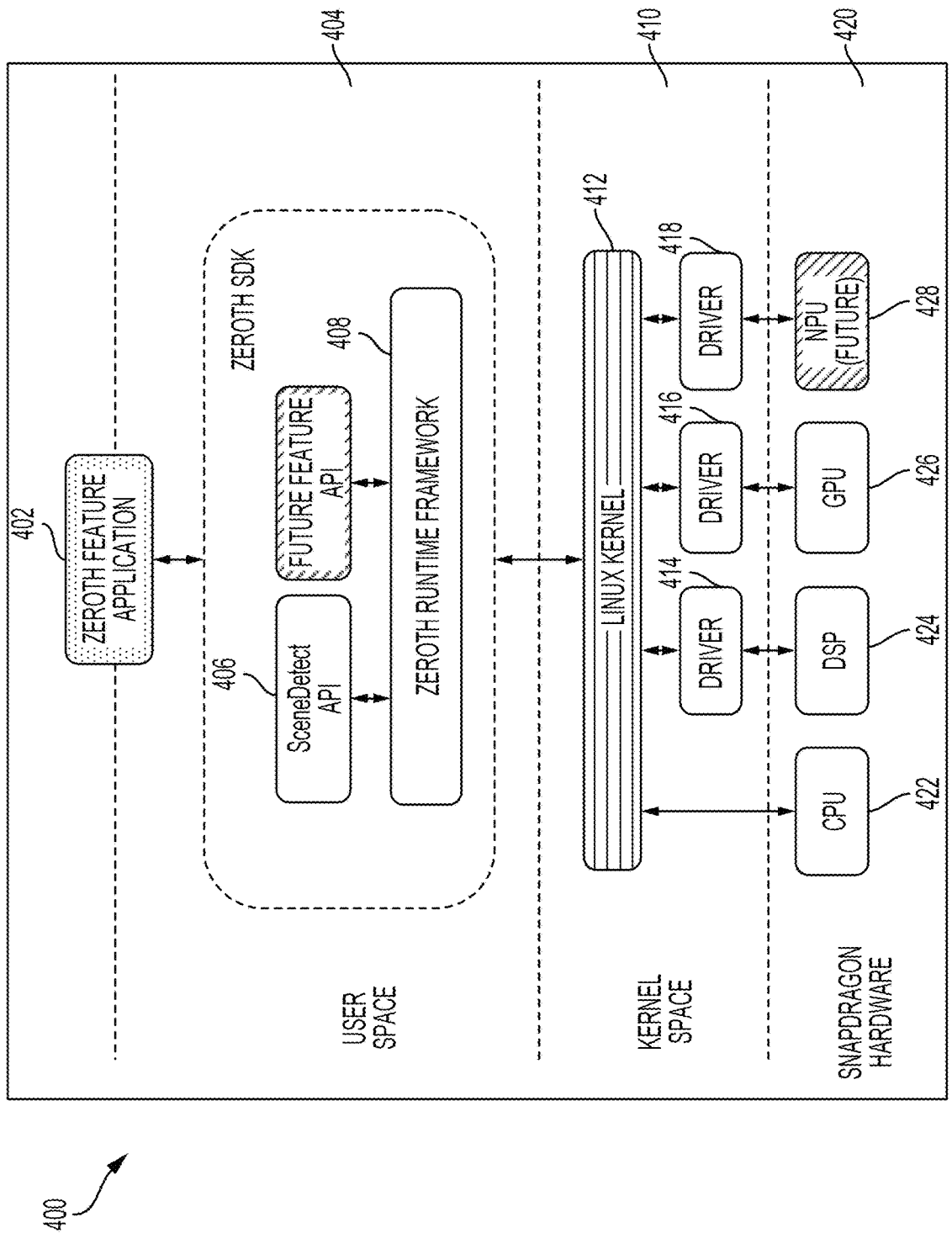
FIG. 4 is a block diagram illustrating an exemplary software architecture that may modularize artificial intelligence (AI) functions in accordance with aspects of the present disclosure.

FIG. 4 is a block diagram illustrating an exemplary software architecture 400 that may modularize artificial intelligence (AI) functions. Using the architecture, applications 402 may be designed that may cause various processing blocks of an SOC 420 (for example a CPU 422, a DSP 424, a GPU 426 and/or an NPU 428) to perform supporting computations during run-time operation of the application 402.

The AI application 402 may be configured to call functions defined in a user space 404 that may, for example, provide for the detection and recognition of a scene indicative of the location in which the device currently operates. The AI application 402 may, for example, configure a microphone and a camera differently depending on whether the recognized scene is an office, a lecture hall, a restaurant, or an outdoor setting such as a lake. The AI application 402 may make a request to compiled program code associated with a library defined in a SceneDetect application programming interface (API) 406 to provide an estimate of the current scene. This request may ultimately rely on the output of a deep neural network configured to provide scene estimates based on video and positioning data, for example.

A run-time engine 408, which may be compiled code of a Runtime Framework, may be further accessible to the AI application 402. The AI application 402 may cause the run-time engine, for example, to request a scene estimate at a particular time interval or triggered by an event detected by the user interface of the application. When caused to estimate the scene, the run-time engine may in turn send a signal to an operating system 410, such as a Linux Kernel 412, running on the SOC 420. The operating system 410, in turn, may cause a computation to be performed on the CPU 422, the DSP 424, the GPU 426, the NPU 428, or some combination thereof. The CPU 422 may be accessed directly by the operating system, and other processing blocks may be accessed through a driver, such as a driver 414-418 for a DSP 424, for a GPU 426, or for an NPU 428. In the exemplary example, the deep neural network may be configured to run on a combination of processing blocks, such as a CPU 422 and a GPU 426, or may be run on an NPU 428, if present.

Figure 5:
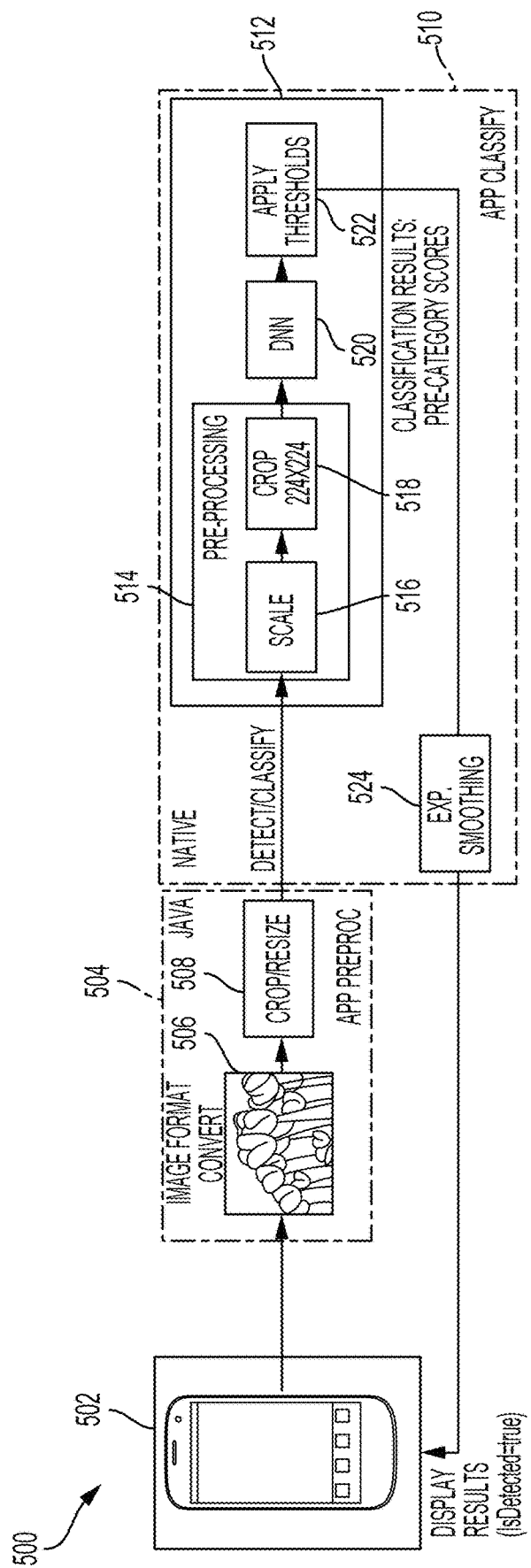
FIG. 5 is a block diagram illustrating the run-time operation of an AI application on a smartphone in accordance with aspects of the present disclosure.

FIG. 5 is a block diagram illustrating the run-time operation 500 of an AI application on a smartphone 502. The AI application may include a pre-process module 504 that may be configured (using for example, the JAVA programming language) to convert the format of an image 506 and then crop and/or resize the image 508. The pre-processed image may then be communicated to a classify application 510 that contains a SceneDetect Backend Engine 512 that may be configured (using for example, the C programming language) to detect and classify scenes based on visual input. The SceneDetect Backend Engine 512 may be configured to further preprocess 514 the image by scaling 516 and cropping 518. For example, the image may be scaled and cropped so that the resulting image is 224 pixels by 224 pixels. These dimensions may map to the input dimensions of a neural network. The neural network may be configured by a deep neural network block 520 to cause various processing blocks of the SOC 100 to further process the image pixels with a deep neural network. The results of the deep neural network may then be thresholded 522 and passed through an exponential smoothing block 524 in the classify application 510. The smoothed results may then cause a change of the settings and/or the display of the smartphone 502.

In one configuration, a model, such as a machine learning model, is configured for receiving second data that may be unlabeled. Additionally, the model may be configured to generate via a first network, second labels for the second data. Moreover, the first network may have been previously trained on first labels for first data. Furthermore, the model may be configured to train a second network on the second data and the second labels. It should be noted the first network and the second network may be defined on the same device or may be defined on different devices.

The model includes a generating means and/or a receiving means. In one aspect, the generating means and/or receiving means may be the general-purpose processor 102, program memory associated with the general-purpose processor 102, memory block 118, local processing units 202, and or the routing connection processing units 216 configured to perform the functions recited. In another configuration, the aforementioned means may be any module or any apparatus configured to perform the functions recited by the aforementioned means.

In another configuration, a model, such as a machine learning model, is configured for receiving second labels generated by a first network using second data. Additionally, the model may be configured to training a second network on the second labels and the second data. Moreover, the first network may have been previously trained on first labels for first data. It should be noted the first network and the second network may be defined on the same device or may be defined on different devices.

The model includes a receiving means and/or a training means. In one aspect, the receiving means and/or training means may be the general-purpose processor 102, program memory associated with the general-purpose processor 102, memory block 118, local processing units 202, and or the routing connection processing units 216 configured to perform the functions recited. In another configuration, the aforementioned means may be any module or any apparatus configured to perform the functions recited by the aforementioned means.

According to certain aspects of the present disclosure, each local processing unit 202 may be configured to determine parameters of the model based upon desired one or more functional features of the model, and develop the one or more functional features towards the desired functional features as the determined parameters are further adapted, tuned and updated.

Transfer Learning in Neural Networks

Machine learning networks, such as neural networks may be trained to classify items from an input, such as an image input and/or an audio input. In some cases, the neural network is trained via back propagation on labeled data. For example, the back propagation may use labeled images of cars to train a neural network to identify different car models.

In one example, a first neural network F may be trained on a first training set D. In this example, the first training set D includes data x and a corresponding label y, such that: $D:=\{(x_i, y_i)\}, i=1 \ldots N$. Thus, after training, the first neural network F may approximate a specific label $y_i$ for a specific image $x_i (F(x_i) \approx y_i)$. In the present disclosure, the training set (e.g., labels and data) may be referred to as labeled data. Furthermore, in the present disclosure, the data of the training set may be referred to as an image.

In some cases, data x and/or labels y of the first training set D may no longer be available after training the first neural network F. That is, in some cases, the data x of the first training set D may no longer be available while the labels y are still available. In other cases, the labels y of the first training set D may no longer be available while the data x is still available. In another example, both the images x and the labels y are unavailable.

In one example, the first training set D may not be available for external distribution due to a restriction, such as a licensing restriction. Thus, because the first training set D is no longer available, the first neural network F may not be updated via incremental learning. According to aspects of the present disclosure, incremental learning refers to modifying an existing boundary of a class of a neural network and/or adding a new class to the neural network.

In one configuration, the original training set may be augmented with additional data and labels to perform the incremental learning. That is, for incremental learning, it is desirable to augment the original training set with a new training set to avoid forgetting the classifications of the original training set. Incremental learning is not limited to augmenting classes or modifying the boundaries of existing classes as other incremental learning functions are also contemplated.

In one configuration, when the first training set D is no longer available after training the first neural network F, a second neural network F' is specified to approximate the first neural network F. Specifically, when the first training set D is no longer available, the first neural network F may be applied to second data $x'_i$ that does not include second labels $y'_i$. In one configuration, the second data $x'_i$ is substantially similar or identical to the first data x of the first training set D. Alternatively, the second data $x'_i$ may not be related to the first data x.

Furthermore, a second training set D' is generated after applying the first neural network F to the second data $x'_i$. That is, after training, second labels $y'_i$ are associated with the second data $x'_i$. Specifically, after training, the second training set D' includes the second data $x'_i$ and the second labels $y'_i$. More specifically, after training the first neural network F on the second data $x'_i$, $D':=\{(x'_i, y'_i)\}$, i=1 N, where $F(x'_i):=y'_i$. Finally, the second training set D' may be used to train a second neural network F' so that the second neural network F' may approximate a specific label $y'_i$ for a specific image $x_i(F'(x'_i) \approx y'_i)$. In one configuration, the second neural network F' has a different size in comparison to the first neural network F. For example, the size of the second neural network F' may be smaller or larger than the size of the first neural network F.

In addition to being trained with the second training set D', the second neural network F' may be trained with a third training set D". The third training set D" may be used to modify one or more existing boundaries of a class in the second neural network F'. For example, the second training set D' may set boundaries for different classes of cars and the third training set D" may modify a boundary to account for a design change of one or more existing cars.

For example, a specific car model, such as car model A, may be associated with a specific label (e.g., class). That is, images of car model A may be labeled as car model A. In this example, the specific car model may receive an update to its design, such as an update to the tail light design. Still, the second training set D' may not include labeled data for the updated car design. Therefore, the boundary of the existing class may be modified to account for the updated design so that the network still labels the updated car model as the specific car model. That is, in this example, the boundary of the car model A class is modified to categorize car model A with the updated tail light design as car model A rather than incorrectly categorizing the car model A with the updated tail light. In this case, a third training set D" containing labeled examples of the new design of car model A could be used, in conjunction with the second training set D', to train a second neural network F' to classify both designs of car model A correctly.

In one configuration, when new examples are added to existing classes, given unlabeled data X and new labeled data $\{(x", y")\}$, the new network F is trained on the union of sets $\{(X, F(X)\}$ and $\{(x", y")\}$.

Additionally, or alternatively, in one configuration, the third training set D" is specified to add one or more new classes to the second neural network F'. For example, if the second training set D' is specified to create classes for different cars, the third training set D" may be specified to add a new class to account for a new car model.

As an example, specific car models, such as car model A, may be associated with a specific class. Additionally, in this example, a new car model, such as car model B, may be introduced by a manufacturer. In this example, the second training set D' did not include labeled data for the new car model. Therefore, based on the training from the second training set D', the network may inaccurately label images of car model B. Thus, in this example, a new class for the new car model B is added to the second neural network F' based on labeled data for new car model B included in the third training set D". That is, in this example, a new car class is created for car model B so that car model B is not incorrectly labeled as car model A.

In one configuration, when adding one or more new classes to a pre-trained network when original training data is unavailable, given unlabeled data X and new labeled data $\{(x", y")\}$, the new network F is trained on the union of sets $\{(X, [F(X); 0*y"]\}$ and $\{(x", [F(X)*0; y"]\}$. According to aspects of the present disclosure, y" may be a vector or a scalar.

In one configuration, the second data $x'_i$ is clustered and compared to the third data $x"_i$ of the third training set D". Furthermore, after the comparison, the second data $x'_i$ is selected for training based on similarity or diversity to the third data $x"_i$.

Figure 6:
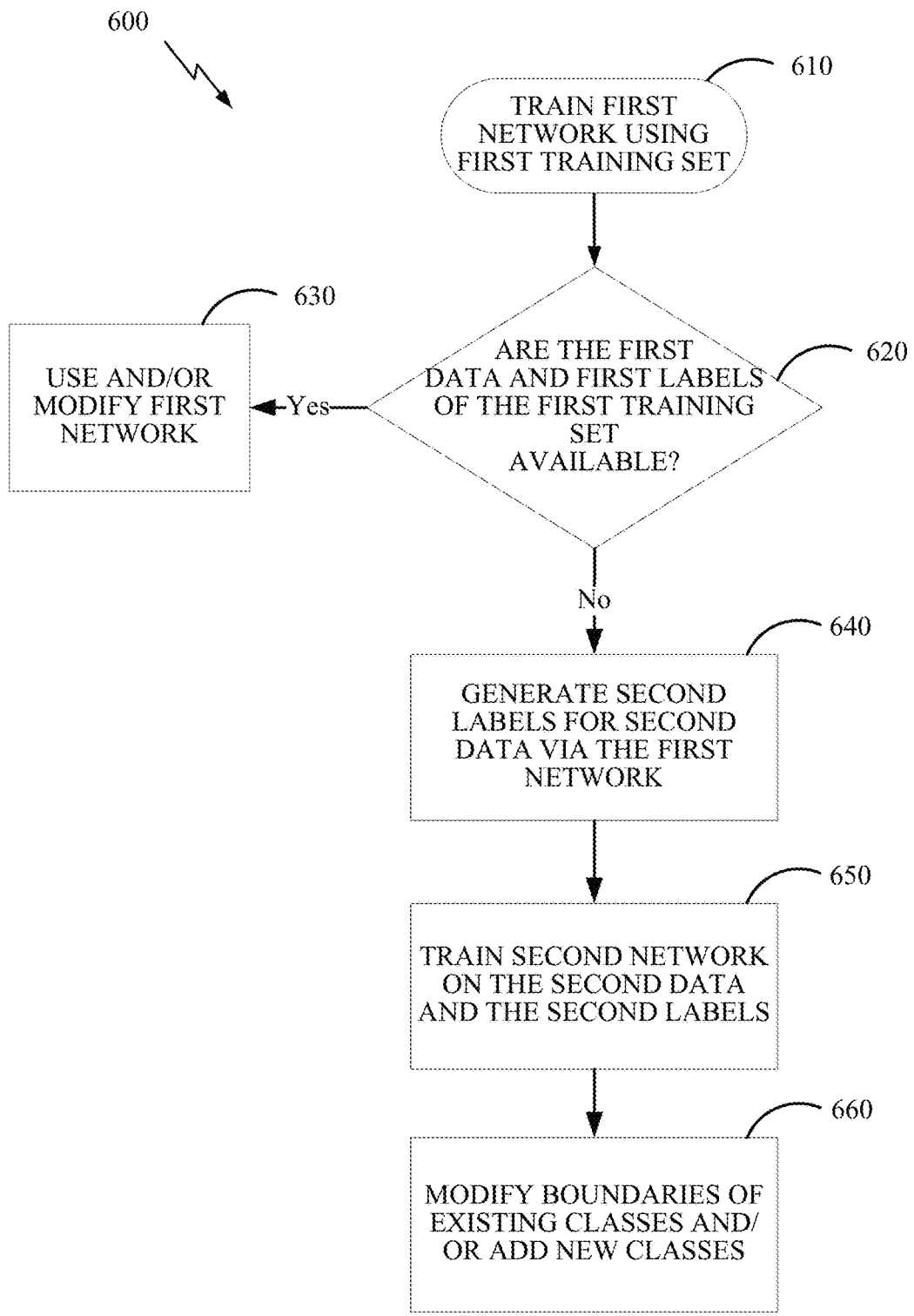
FIG. 6 is a flow diagram for transfer learning according to aspects of the present disclosure.

FIG. 6 illustrates an example of a flow diagram 600 for transfer learning according to aspects of the present disclosure. As shown in FIG. 6, at block 610, a first network is trained with a first training set. Furthermore, at block 620, a network and/or user may determine whether first data and first labels of the first training set are available. If the first data and first labels are available, the first network may be used and/or modified as desired, at block 630.

The first data and first labels may be unavailable because of restricted distribution rights. As another example, the first data and first labels may be unavailable due to memory restriction. In this example, the system that is performing the incremental learning may not have the memory capacity to hold the first training set. Additionally or alternatively, the system may not have the time or connectivity specified to download the first training set. Therefore, due to system constraints, a second training set may be generated from the first trained network during the training process. Aspects of the present disclosure are not limited to the first data and first labels being unavailable due to distribution rights or system constraints, as other reasons for the first data and first labels being unavailable are also contemplated.

Additionally, if the first labels and/or the first data (e.g., first training set) are not available, second labels are generated for second data via the first network, at block 640. The second data may or may not be based on the first data. After generating the second labels, a second network may be trained on the second labels and the second data (e.g., second training set), at block 650. Furthermore, after the second network has been trained, third data and third labels (e.g., third training set) may be used with the second labels and second data to add new classes to the second network and/or modify boundaries for existing classes of the second network, at block 660.

Figure 7A:
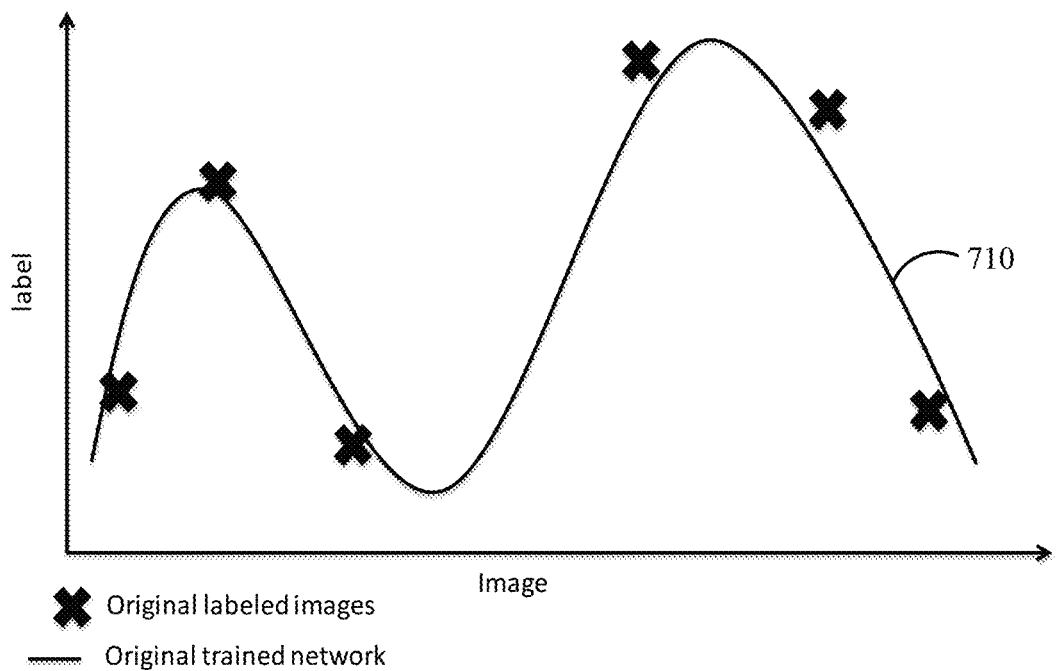
FIGS. 7A-7E illustrate examples of different networks according to aspects of the present disclosure.

FIG. 7A illustrates an example of an original network 710 trained with a first training set. As shown in FIG. 7A, labels (y-axis) are specified for images (x-axis). Furthermore, the original network 710 is trained on the labeled images and is approximated to the labeled images.

Figure 7B:
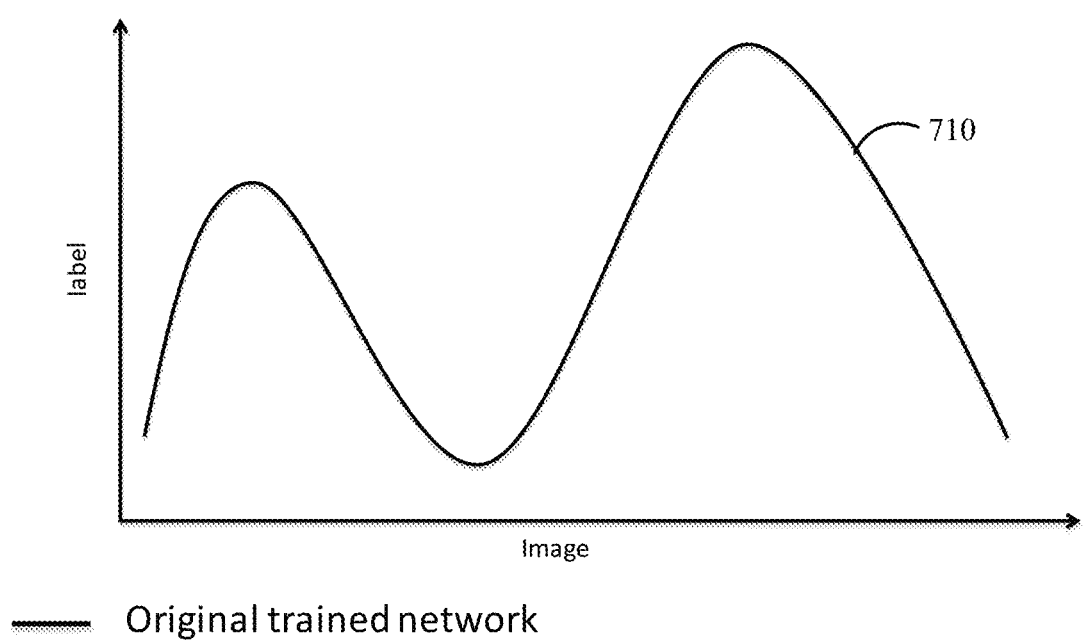

As previously discussed, the first labels and/or the first data (e.g., first training set) may not be available after training the original network 710. FIG. 7B illustrates an example of the original network 710 without the first training set. As shown in FIG. 7B, even though the first training set is no longer available, the original network may still be used to classify unlabeled second data based on the training from the first training set. Still, it may be desirable to add new classes and/or modify boundaries for existing classes. In most cases, when training the network to add new classes and/or modify boundaries for existing classes, the network is trained using the original training set, such as the first training set, and an additional training set, such as the second training set. The labels and data of the additional training set may be used to add new classes and/or modify boundaries for existing classes.

Figure 7C:
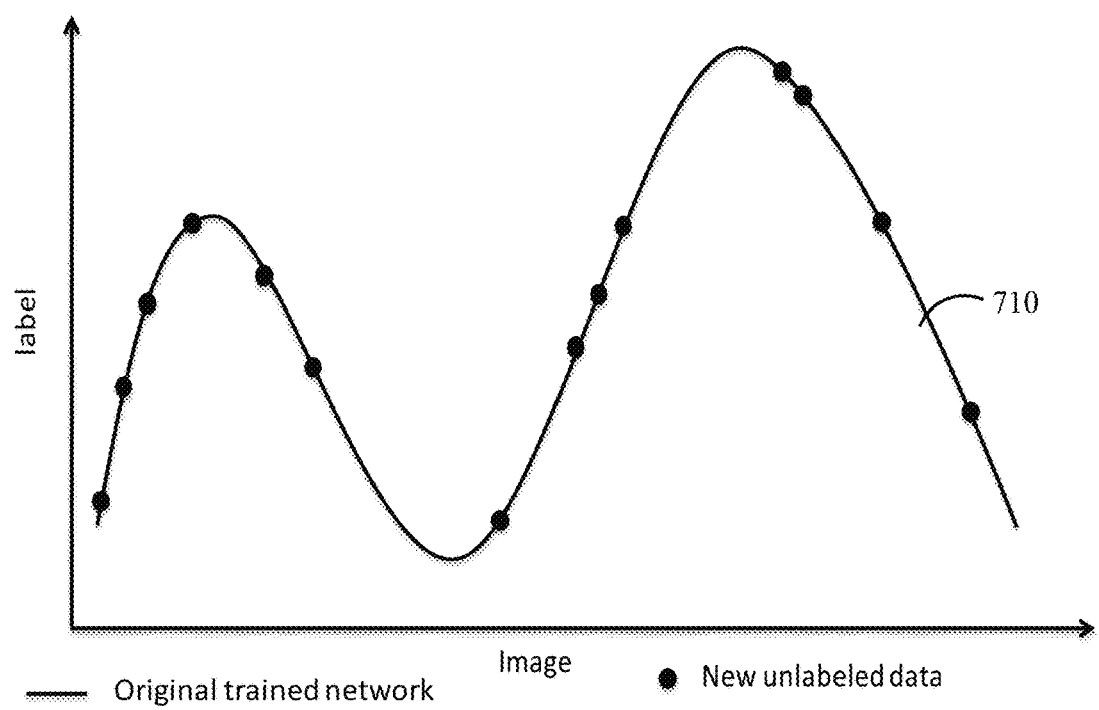

Thus, according to an aspect of the present disclosure, a new network may be specified for adding new classes and/or modifying boundaries for existing classes. In one configuration, the new network is generated by providing labels to unlabeled data via the original network. As shown in FIG. 7C, the original network 710 is used to label the unlabeled data. That is, the original network 710 may be specified to generate second labels for unlabeled second data. In one configuration, the second data is substantially similar to the first data.

Figure 7D:
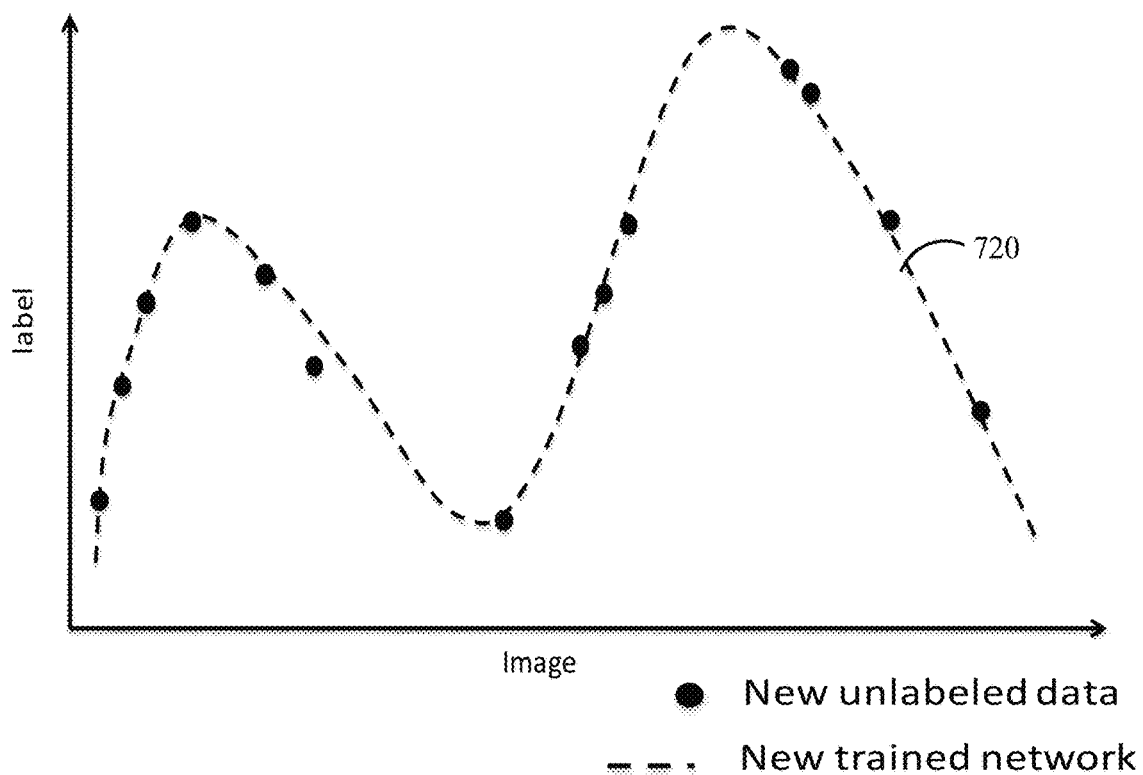

Furthermore, as shown in FIG. 7D, the second data and the second labels are used to train a new network 720. After the new network 720 has been trained with the second data and the second labels, the new network 720 may be further trained on the second data and the second labels that have been augmented with third labels and third data to add new classes and/or to modify boundaries for existing classes.

Figure 7E:
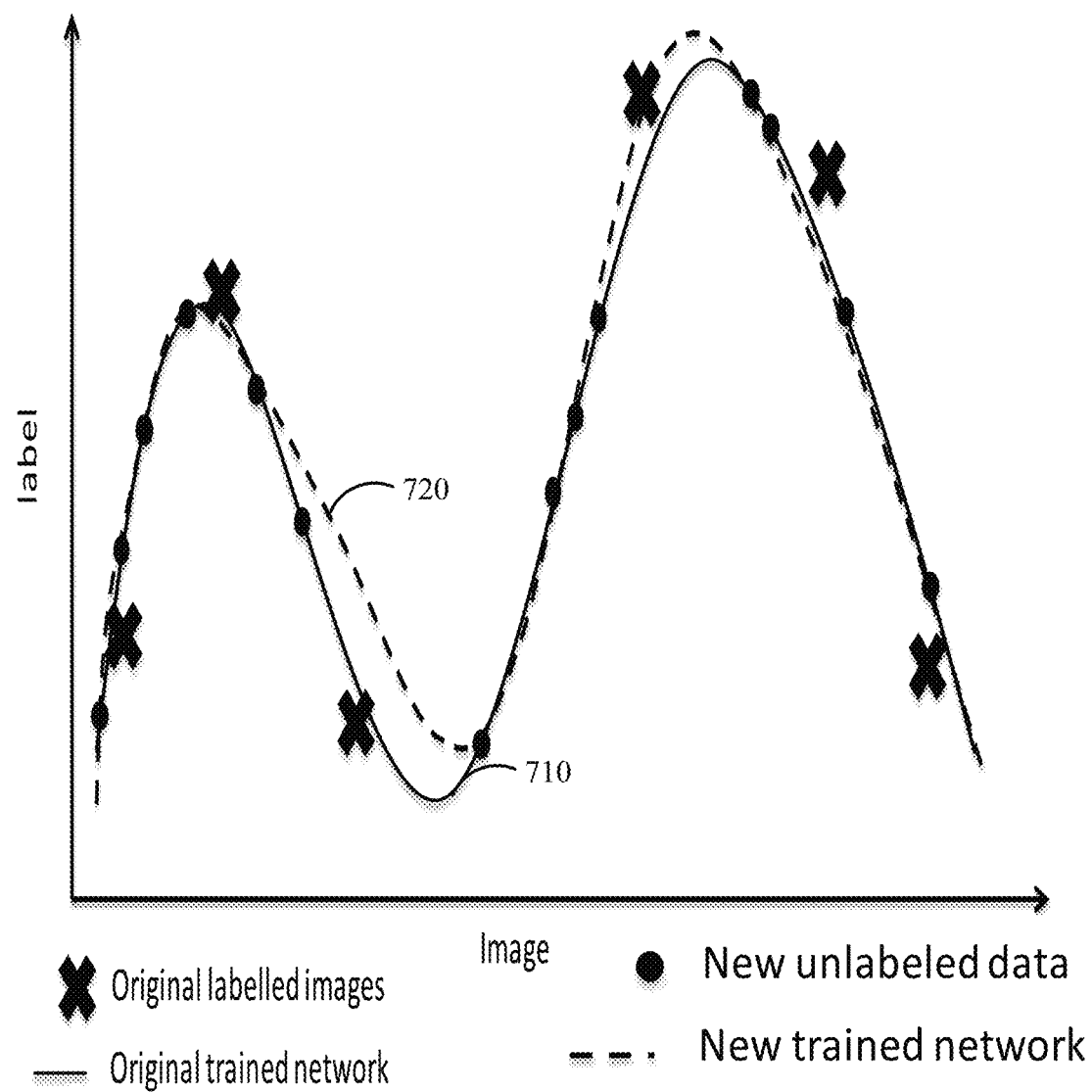

FIG. 7E illustrates a comparison of the original network 710 and the new network 720. As shown in FIG. 7E, the new network 720 is similar to the original network 710.

Figure 8:
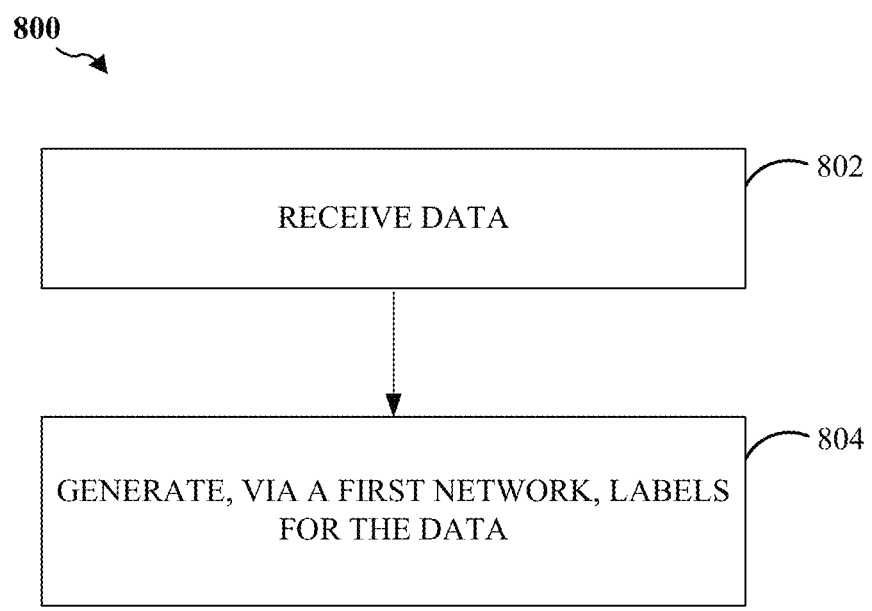
FIGS. 8 and 9 illustrate methods for transfer learning according to aspects of the present disclosure.

FIG. 8 illustrates a method 800 for transfer learning according to an aspect of the present disclosure. In block 802, second data is received. In one configuration, the second data is unlabeled. Additionally, in block 804 a first network generates second labels for the second data. In one configuration, the first network has been previously trained on first labels for first data. Furthermore, the second labels may be generated for training a second network. It should be noted the first network and the second network may be defined on the same device or may be defined on different devices. The second data can be substantially similar to the first data. In another example, the second data is identical to the first data, but the first labels may or may not be available.

Figure 9:
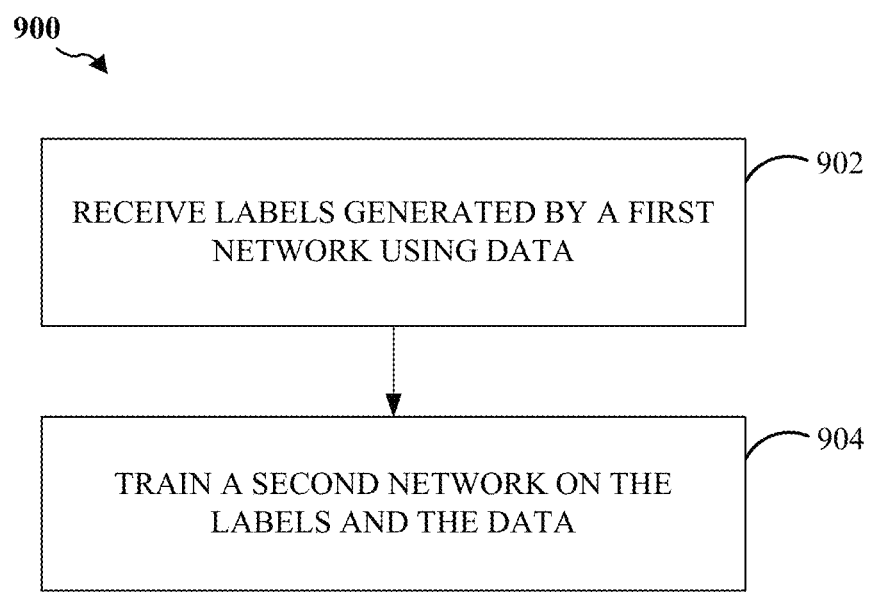

FIG. 9 illustrates a method 900 for transfer learning according to an aspect of the present disclosure. In block 902, a second network receives second labels generated by a first network using second data. In one configuration, the second data is unlabeled prior to the labeling by the first network. Furthermore, in one configuration, the first network is previously trained on first labels and first data. Additionally, in block 904 the second network is trained on the second labels and the second data. It should be noted the first network and the second network may be defined on the same device or may be defined on different devices. The second data can be substantially similar to the first data. In another example, the second data is identical to the first data, but the first labels may or may not be available.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all of which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium.

Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of transfer learning, comprising:
   receiving, at a first trained neural network, second un-labeled data;
   generating, via the first trained neural network, second labeled data by labeling the second un-labeled data, the first trained neural network having been trained on first labeled data prior to receiving the second un-labeled data, and the first labeled data being different from the second labeled data;
   training a second neural network with the second labeled data after the first trained neural network labeled the second un-labeled data, the second neural network being different from the first trained neural network;
   re-training the second trained neural network with updated training data after training the first trained neural network and the second trained neural network, the updated training data comprising a combination of the second labeled data and third labeled data, the second un-labeled data being different from third un-labeled data used for generating the third labeled data; and
   classifying, via the second trained neural network, an input received at the second trained neural network.

2. The method of claim 1, in which a size of the second trained neural network is different from a size of the first trained neural network.

3. The method of claim 2, further comprising modifying at least one existing boundary of a class in the second trained neural network based at least in part on the third labeled data.

4. The method of claim 2, further comprising adding at least one new class in the second trained neural network based at least in part on the third labeled data.

5. The method of claim 1, in which the first labeled data is generated by associating first labels with first un-labeled data, and at least one of the first un-labeled data or the first labels are not available after training the first trained neural network.

6. The method of claim 1, further comprising:
   clustering the second labeled data;
   comparing the clustered second labeled data to the third labeled data; and
   selecting the second labeled data for the updated training data based at least in part on a similarity to the third labeled data or a difference from the third labeled data.

7. A method of transfer learning, comprising:
   receiving, at a second neural network, second labeled data labeled by a first trained neural network based on a classification of second un-labeled data, the first network having been trained on first labeled data prior to receiving the second un-labeled data, and the first labeled data being different from the second labeled data;
   training the second neural network on the second labeled data after the first trained neural network labeled the second un-labeled data, the second neural network being different from the first trained neural network;
   re-training the second trained neural network with updated training data after training the first trained neural network and the second trained neural network, the updated training data comprising a combination of the second labeled data and third labeled data, the second un-labeled data being different from third un-labeled data used for generating the third labeled data; and
   classifying, via the second trained neural network, an input received at the second trained neural network.

8. The method of claim 7, further comprising:
   clustering the second labeled data;
   comparing the clustered second labeled data to the third labeled data; and
   selecting the second labeled data for the updated training data based at least in part on a similarity to the third labeled data or a difference from the third labeled data.

9. The method of claim 7, in which a size of the second trained neural network is different from a size of the first trained neural network.

10. The method of claim 9, further comprising modifying at least one existing boundary of a class in the second trained neural network based at least in part on the third labeled data.

11. The method of claim 9, further comprising adding at least one new class in the second trained neural network based at least in part on the third labeled data.

12. The method of claim 7, in which the first labeled data is generated by associating first labels with first un-labeled data, and at least one of the first un-labeled data or the first labels are not available after training the first trained neural network.

13. An apparatus for transfer learning, comprising:
   a memory unit; and
   at least one processor coupled to the memory unit, the at least one processor configured:

to receive, at a first trained neural network, second un-labeled data;

to generate, via the first trained neural network, second labeled data by labeling the second un-labeled data, the first trained neural network having been trained on first labeled data prior to receiving the second un-labeled data, and the first labeled data being different from the second labeled data;

to train a second neural network with the second labeled data after the first trained neural network labeled the second un-labeled data, the second neural network being different from the first trained neural network;

to re-train the second trained neural network with updated training data after training the first trained neural network, the updated training data comprising a combination of the second labeled data and third labeled data, the second un-labeled data being different from third un-labeled data used for generating the third labeled data; and to classify, via the second trained neural network, an input received at the second trained neural network.

14. The apparatus of claim 13, in which a size of the second trained neural network is different from a size of the first trained neural network.

15. The apparatus of claim 14, in which the at least one processor is further configured to modify at least one existing boundary of a class in the second trained neural network based at least in part on the third labeled data.

16. The apparatus of claim 14, in which the at least one processor is further configured to add at least one new class in the second trained neural network based at least in part on the third labeled data.

17. The apparatus of claim 13, in which the first labeled data is generated by associating first labels with first un-labeled data, and at least one of the first un-labeled data or the first labels are not available after training the first trained neural network.

18. The apparatus of claim 13, in which the at least one processor is further configured:

to cluster the second labeled data;

to compare the clustered second labeled data to the third labeled data; and to select the second labeled data for the updated training data based at least in part on a similarity to the third labeled data or a difference from the third labeled data.

19. An apparatus for transfer learning, comprising:

a memory unit; and at least one processor coupled to the memory unit, the at least one processor being configured:

to receive, at a second neural network, second labeled data labeled by a first trained neural network based on a classification of second un-labeled data, the first network having been trained on first labeled data prior to receiving the second un-labeled data, and the first labeled data being different from the second labeled data;

to train the second neural network on the second labeled data after the first trained neural network labeled the second un-labeled data, the second neural network being different from the first trained neural network;

to re-train the second trained neural network with updated training data after training the first trained neural network, the updated training data comprising a combination of the second labeled data and third labeled data, the second un-labeled data being different from third un-labeled data used for generating the third labeled data; and to classify, via the second trained neural network, an input received at the second trained neural network.

20. The apparatus of claim 19, in which the at least one processor is further configured:

to cluster the second labeled data;

to compare the clustered second labeled data to the third labeled data; and to select the second labeled data for the updated training data based at least in part on a similarity to the third labeled data or a difference from the third labeled data.

21. The apparatus of claim 19, in which a size of the second trained neural network is different from a size of the first trained neural network.

22. The apparatus of claim 21, in which the at least one processor is further configured to modify at least one existing boundary of a class in the second trained neural network based at least in part on the third labeled data.

23. The apparatus of claim 21, in which the at least one processor is further configured to add at least one new class in the second trained neural network based at least in part on the third labeled data.

24. The apparatus of claim 19, in which the first labeled data is generated by associating first labels with first un-labeled data, and at least one of the first un-labeled data or the first labels are not available after training the first trained neural network.

25. A non-transitory computer-readable medium having program code recorded thereon, the program code comprising:

program code to receive, at a first trained neural network, second un-labeled data;

program code to generate, via the first trained neural network, second labeled data by labeling the second un-labeled data, the first trained neural network having been trained on first labeled data prior to receiving the second un-labeled data, and the first labeled data being different from the second labeled data;

program code to train a second neural network with the second labeled data after the first trained neural network labeled the second un-labeled data, the second neural network being different from the first trained neural network;

program code to re-train the second trained neural network with updated training data after training the first trained neural network, the updated training data comprising a combination of the second labeled data and third labeled data, the second un-labeled data being different from third un-labeled data used for generating the third labeled data; and program code to classify, via the second trained neural network, an input received at the second trained neural network.

26. A non-transitory computer-readable medium having program code recorded thereon, the program code comprising:

program code to receive, at a second neural network, second labeled data labeled by a first trained neural network based on a classification of second un-labeled data, the first network having been trained on first labeled data prior to receiving the second un-labeled data, and the first labeled data being different from the second labeled data;

program code to train the second neural network on the second labeled data after the first trained neural network labeled the second un-labeled data, the second neural network being different from the first trained neural network;

program code to re-train the second trained neural network with updated training data after training the first trained neural network, the updated training data comprising a combination of the second labeled data and third labeled data, the second un-labeled data being different from third un-labeled data used for generating the third labeled data; and program code to classify, via the second trained neural network, an input received at the second trained neural network.

\* \* \* \* \*